(12) United States Patent
Zapirain

(10) Patent No.: US 7,172,159 B1
(45) Date of Patent: Feb. 6, 2007

(54) PARACHUTE STEERING SYSTEM

(76) Inventor: Jose Francisco Zapirain, P.I. El Ramassar, c/ Valles s/n, Les Franqueses del Valles (ES) 08520

( * ) Notice: Subject to any disclaimer, the term of this patent is extended or adjusted under 35 U.S.C. 154(b) by 0 days.

(21) Appl. No.: 11/209,075

(22) Filed: Aug. 22, 2005

(30) Foreign Application Priority Data

Jul. 4, 2005 (EP) ................... 05380146

(51) Int. Cl.
*B64D 17/14* (2006.01)
(52) U.S. Cl. .................. 244/152; 244/137.3
(58) Field of Classification Search ........... 244/152, 244/138 R, 137.3, 142
See application file for complete search history.

(56) References Cited

U.S. PATENT DOCUMENTS 4,865,274 A * 9/1989 Fisher ................ 244/152
5,080,305 A * 1/1992 Stencel et al. ............ 244/152
5,899,415 A * 5/1999 Conway et al. ........... 244/152
2004/0169111 A1* 9/2004 Christof .................. 244/152

* cited by examiner

*Primary Examiner*—J. Woodrow Eldred
(74) *Attorney, Agent, or Firm*—Robert M. Schwartz; Alfred K. Dassler

(57) ABSTRACT

A parachute steering system allows load drops to be guided until being landed on a defined target. The steering system includes an upper platform and a lower platform, joined in articulated fashion. The upper platform incorporates a device for fastening the parachute thereto, while the lower platform has a device for anchoring the load. The two platforms are connected to each other through the use of an actuator system which allows the parallelism or inclination between them to be altered, also displacing the center of gravity of the parachute-load combination, and therefore allowing the direction of the displacement of the load to be altered, as well as the speed of the same.

4 Claims, 3 Drawing Sheets

PARACHUTE STEERING SYSTEM

BACKGROUND OF THE INVENTION

1. Field of the Invention

The present invention relates to a parachute steering system which has been specially conceived for its installation in unmanned parachutes, that is, those intended for dropping guided loads.

2. Description of the Related Art

The current systems of parachute guidance usually employ radio-control or satellite localization (GPS) devices as the system header, as well as a number of electric actuators to pull on the control lines by winding the same onto their corresponding spool.

The problem with that type of system is that if a control line is wound over itself on the spool of the actuator, a problem automatically arises of the impossibility of releasing the control, which can cause loss of the load.

In addition, in that case, and even with recovery of the device, the preparation for the following drop is complicated by having to dismantle the spool.

SUMMARY OF THE INVENTION

It is accordingly an object of the invention to provide a parachute steering system, which overcomes the hereinafore-mentioned disadvantages of the heretofore-known devices of this general type and which has a robust structure without any spools, is substantially simpler than the guidance systems existing up to now and is much more reliable in operation.

With the foregoing and other objects in view there is provided, in accordance with the invention, a parachute steering system, of the type utilized to carry out the dropping of loads, to land them on a predetermined target. The parachute steering system comprises upper and lower platforms articulatingly joined to each other. The upper platform has a device for fastening a parachute, and the lower platform has a device for anchoring the load. An actuator system interconnects the platforms and allows parallelism, inclination and relative positioning in general between the platforms to be regulated, displacing a center of gravity of a combination of the load and the parachute.

In accordance with a concomitant feature of the invention, there is provided a system allowing a variation of relative positions of the platforms, such as an articulated coupling between the platforms.

The parachute steering system which the invention discloses resolves the problem outlined above in a fully satisfactory manner, by providing a mechanism which does not act on the length of the lines, but rather displaces the center of gravity of the load with respect to the parachute, avoiding the use of the aforesaid spools and employing actuators of more reduced dimensions.

To this end, and in specific terms, the steering system which is disclosed is constituted on the basis of an upper platform, to which the parachute is fastened, and a lower platform, equipped with measures for securing the load, so that both platforms are connected to each other through the use of an articulated coupling, or of any type which allows the variation of their relative position.

The articulated coupling permits, through the use of any kind of actuator system connected to both platforms and with a configuration significantly smaller than that of the conventional guidance devices, the possibility to control the relative angular position between the two platforms, both in their transversal and their longitudinal plane.

In this way, through the use of the relative angular displacement between the platforms, with respect to an imaginary axis of rotation parallel to the trajectory of the load-parachute combination, on one hand it is possible to displace the center of gravity of the combination, toward one side or another, producing such asymmetries in the parachute that as a consequence a turn is produced in the trajectory of the same, it being possible to control the radius of curvature of the turn as a function of the relative inclination between the two platforms.

On the other hand, when carrying out a relative angular displacement between the upper platform and the lower platform with respect to an imaginary axis transverse to the forward trajectory of the parachute, the displacements of the center of gravity of the aforementioned combination cause displacements in the relative position of the parachute with respect to the load which signify an increase or decrease in the forward speed of the combination, in terms of the angular displacement being positive or negative.

It is pointed out that the transversal axis of rotation between the two platforms need not be centered, since an off-centered position of the same reduces the necessary force of the actuator to move the plaftforms.

Other features which are considered as characteristic for the invention are set forth in the appended claims.

Although the invention is illustrated and described herein as embodied in a parachute steering system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of the specific embodiment when read in connection with the accompanying drawings.

DESCRIPTION OF THE PREFERRED EMBODIMENTS

Figure 1:
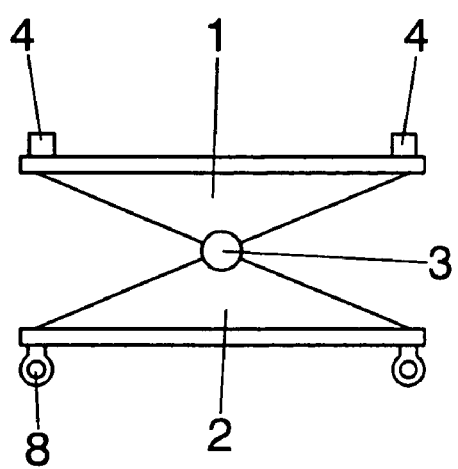
FIG. 1 is a diagrammatic, front-elevational view of a parachute steering system implemented in accordance with the object of the present invention.

Referring now to the figures of the drawing in detail and first, particularly, to FIG. 1 thereof, it is seen how the parachute steering system which the invention discloses is incorporated based on an upper platform 1 and a lower platform 2 coupled in articulated fashion through any device 3 for articulation, such as a hinge joint.

Both platforms 1 and 2 have a similar geometry which in this example of a practical embodiment is realized in a square-based pyramidal geometry, facing each other and joined in articulated fashion by one of their vertexes, but which could have any other geometry which facilitates the angular displacement between the same, without it affecting the basic nature of the invention.

Figure 2:
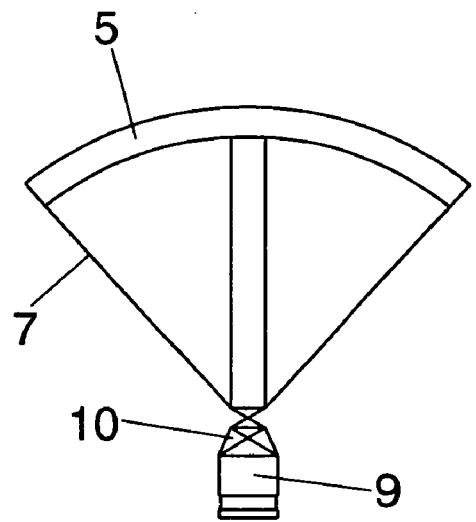
FIG. 2 is a front-elevational view of the steering system of FIG. 1 mounted in a parachute, and coupled to its corresponding load.
Figure 4:
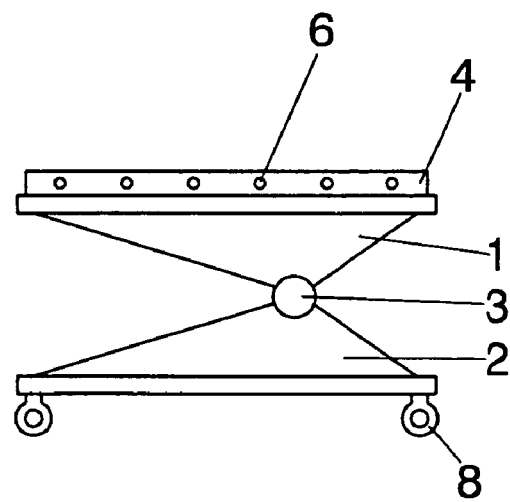
FIG. 4 is a side-elevational view of the steering system of FIG. 1.

The upper platform 1 incorporates a device 4-4' for securing a parachute 5, shown in FIG. 2, to the same, which can be realized in a pair of plates integral with the platform, disposed lengthwise, that is, in the forward direction of the load-parachute combination, on individual side edges of the platform. The plates 4-4' are provided with corresponding orifices 6 thereof, shown in FIG. 4, for anchoring the parachute 5.

In addition, the lower platform 2 incorporates a device 8 for the securing of a load 9, which can be realized as lugs mounted on each of the vertexes of the platform 2. The device 8 allows the load 9 mounted on a platform 11 to be secured through the use of retaining bands 10. The load is equipped with a damping element 12 which absorbs the energy of impact produced in landing, all of which can be observed in FIGS. 2 and 3.

Figure 10:
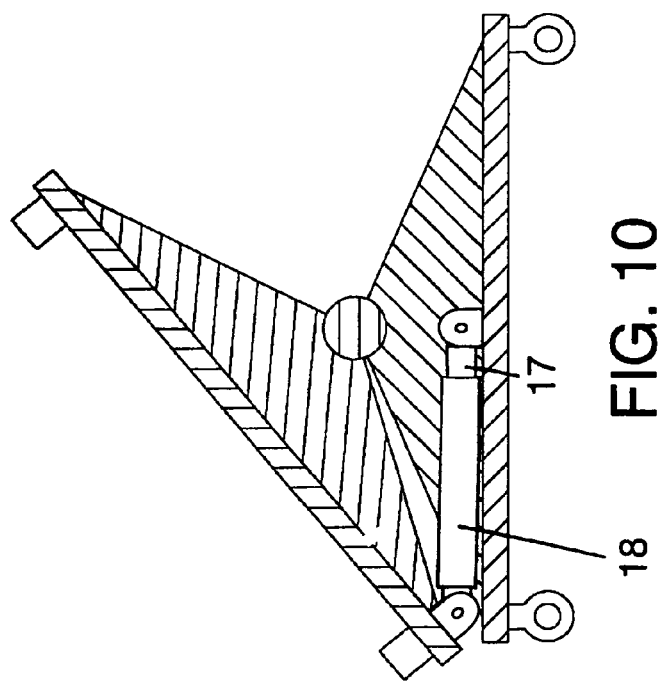
FIGS. 9 and 10 are enlarged front-elevational views respectively showing the platforms in parallel and non-parallel positions as controlled by an actuator system.
Figure 9:
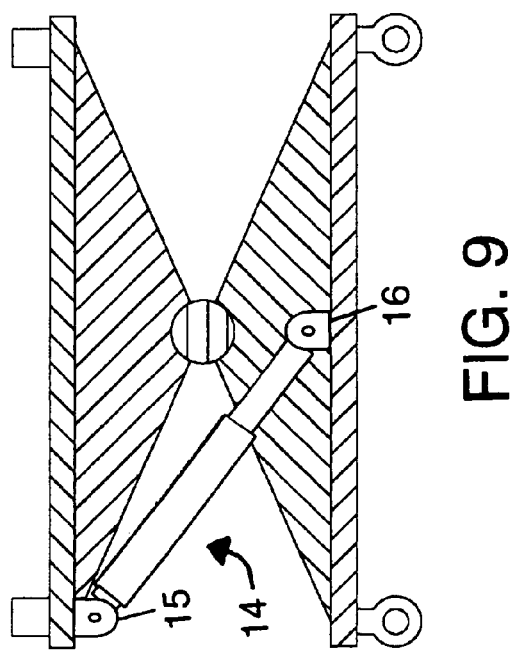

The steering system will incorporate any kind of actuator system, such as a piston and cylinder system 14 shown in FIGS. 9 and 10, so that by one end 15 it is joined to one of the platforms and by the other end 16 to the complementary platform. This allows the angular displacement of the platform 1 with respect to the platform 2, both in a transversal plane and a longitudinal plane, through the use of the actuation of the actuators and due to the hinge element 3.

As has been mentioned above, upon varying the relative position between platforms 1 and 2, to a position in which they are not parallel, by retracting the piston 17 into the cylinder 18 as seen in FIG. 10, the center of gravity of the parachute-load combination is displaced, which causes a distribution of tensions in lines 7 of the parachute 5 to be modified. It is possible to control the distribution of tensions through the above-mentioned actuator system 14 to carry out turns, as well as to reduce or raise the speed of the combination.

Figure 3:
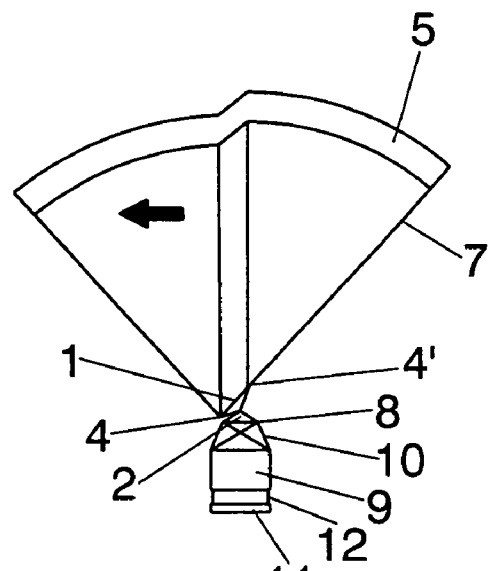
FIG. 3 is a similar view to that of FIG. 2, in which one can observe how through the use of the relative angular displacement between platforms with respect to a longitudinal tilting axis, it is possible to displace the center of gravity of the combination and to make the load turn.

More specifically, and as one can see in FIGS. 2 and 3, while platforms 1 and 2 remain parallel to each other, the combination will advance in a straight line so that if, through the use of the actuator system 14, the platform 1 is angularly displaced in the counter-clockwise direction with respect to the platform 2, and in accordance with a longitudinal axis of rotation, the displacement produces a displacement of the center of gravity of the combination to the left. That is realized in a greater distribution of tensions in the lines connected to the plate 4, diminishing the tension in the lines fastened to the plate 4', which causes asymmetry in the parachute 5 which makes it change its trajectory to a curved trajectory, the radius of rotation of which will be determined by the relative inclination between the two platforms 1 and 2.

Figure 5:
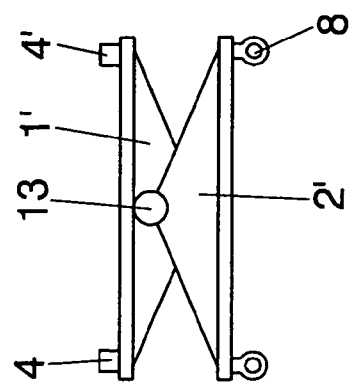
FIG. 5 is a side-elevational view similar to that of FIG. 2.
Figure 6:
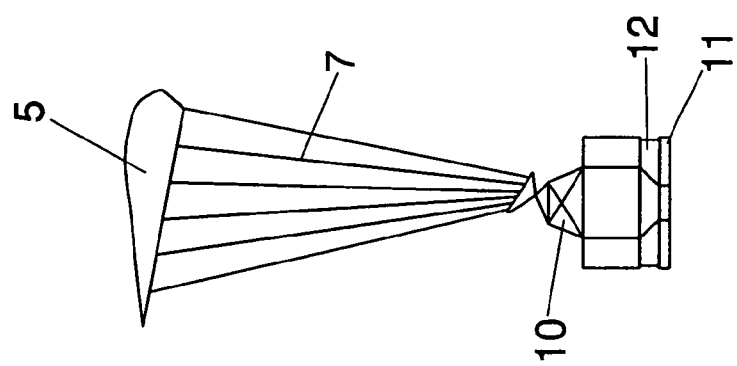
FIGS. 6 and 7 are views similar to FIG. 5, wherein it is seen how through the use of relative angular displacement between platforms relative to an axis of transversal tilting, it is possible to reduce or increase a forward speed of the load.
Figure 7:
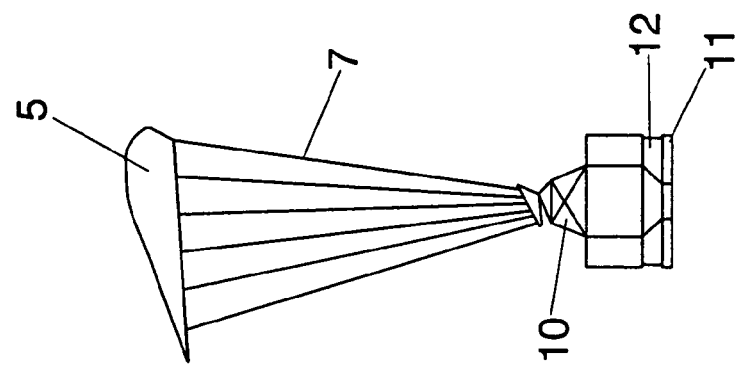

In addition, as one can observe in FIGS. 5, 6 and 7, if the actuator system 14 displaces the platform 1 angularly in the counter-clockwise direction with respect to the platform 2, and in accordance with a transversal axis of rotation, the displacement causes a displacement of the center of gravity of the combination backwards, which affects the distribution of the tensions in each of the lines fastened to the plates 4-4', which signifies a variation in the relative positioning between the parachute and the air stream impinging thereon, reducing the speed of the combination (FIG. 6). However, if a displacement takes place in the clockwise direction between the platforms 1 and 2, the relative positioning between the parachute and the air stream impinging thereon favors a smaller aerodynamic resistance of the combination, raising the speed of the same (FIG. 7).

Figure 8:
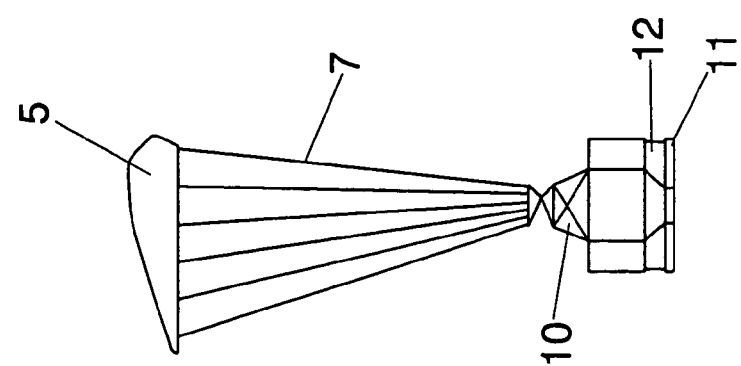
FIG. 8 is a front-elevational view of a second example of practical embodiment of the invention.

In FIG. 8, a second example of a practical embodiment of the invention has been represented, in which a steering system guidance is shown, constituted by an upper platform 1' equipped with a device 4-4' for fastening the parachute, and a lower platform 2' equipped with a device 8 for securing the load. The platforms are joined to each other through the use of any kind of articulation system 13, which allows relative tilting with less force, due to the proximity of the line which joins the device 4 with the device 4' and the articulation element 13, thereby decreasing the necessary coupling.

In addition, the steering system could be fitted with a single transversal axle, with its corresponding actuator system, which would allow only the speed of the combination to be controlled.

I claim:

1. A parachute steering system, of the type utilized to carry out the dropping of loads, to land them on a predetermined target, which comprises:
   upper and lower platforms articulatingly joined to each other, said upper platform having a device for fastening a parachute, and said lower platform having a device for anchoring the load, said device for fastening a parachute having at least two separated fastening points; and
   an actuator system interconnecting said platforms and regulating angular displacement between said platforms for displacing a center of gravity of a combination of the load and the parachute, wherein said actuator system has a piston connected to one of said platforms and a cylinder connected to the other of said platforms.

2. The parachute steering system according to claim 1, which further comprises a system allowing a variation of relative positions of said platforms.

3. The parachute steering system according to claim 2, wherein said system allowing a variation of relative positions of said platforms is an articulated coupling between said platforms.

4. The parachute steering system according to claim 1, wherein said actuator system has a linear actuator connected between said platforms for regulating the angular displacement.

* * * * *